J. DEWRANCE.
Cock.

No. 221,288. Patented Nov. 4, 1879.

WITNESSES:

INVENTOR:
John Dewrance.
By his Attorneys

J. DEWRANCE.
Cock.

No. 221,288. Patented Nov. 4, 1879.

WITNESSES

INVENTOR:
John Dewrance,
By his Attorneys,

J. DEWRANCE.
Cock.

No. 221,288. Patented Nov. 4, 1879.

WITNESSES:
Wm A. Skinkle
Chas H. Baker

INVENTOR:
John Dewrance
By his Attorneys
Baldwin, Hopkins & Peyton

J. DEWRANCE.
Cock.

No. 221,288. Patented Nov. 4, 1879.

UNITED STATES PATENT OFFICE.

JOHN DEWRANCE, OF 176 GREAT DOVER STREET BOROUGH, COUNTY OF SURREY, ENGLAND.

IMPROVEMENT IN COCKS.

Specification forming part of Letters Patent No. 221,288, dated November 4, 1879; application filed October 1, 1879; patented in England, October 23, 1877.

*To all whom it may concern:*

Be it known that I, JOHN DEWRANCE, of 176 Great Dover Street Borough, in the county of Surrey, England, have invented new and useful Improvements in Cocks, which improvements are fully set forth in the following specification, reference being had to the accompanying drawings.

This invention is in the main similar to that for which English Letters Patent were granted me October 23, 1877, No. 3,922; and it relates especially to improvements in cocks of the class shown by United States Letters Patent dated October 2, 1877, No. 195,707, granted John Dewrance (myself) and James Mallinson, which are kept tight by means of packing, and not by the accurate fitting of metallic surfaces.

I now construct such cocks with a cylindrical or parallel plug instead of the before-employed taper plug of Patent No. 195,707, and the shell of the cock I make with a corresponding cavity, which is closed at one end and open at the other to admit the plug. Near the open end the cavity is enlarged and adapted to receive a gland to compress the packing.

The packing which I employ is composed of asbestus. It is placed around the plug in the enlarged part of the cavity, also in grooves formed in the shell parallel to the axis of the plug, and on either side of and at some distance from the water-way, as before, in said Patent No. 195,707, and also between the end of the plug and the bottom of the cavity in the shell, instead of leaving the bottom unpacked, as before. The packing in the grooves is continuous with the packing at the end of the plug and with that around it near its outer end, upon which the pressure of the gland is immediately exerted.

The gland also bears upon a shoulder on the plug, forcing it down and compelling it to compress the packing resting upon the bottom of the cavity in the shell.

To reduce the area of the packing at the inner end of the plug, I form a cylindrical cavity within it, and a corresponding projection enters the cavity. The projection is most conveniently formed in connection with a loose piece or thimble, which is dropped onto the bottom of the cavity in the shell, and thus the packing at the end of the plug is confined to a comparatively narrow ring. This loose piece or thimble is not in my above-referred-to English Patent No. 3,922 of 1877, and it constitutes the leading feature of difference between my present improvements and those covered by my said English patent.

I sometimes turn down the plug to form a shoulder where the packing comes into contact with it, and I employ a gland which is drawn up by side bolts. I form lugs upon the gland corresponding to the packing-grooves formed in the shell, to compress the packing which these grooves contain.

For some descriptions of cocks I place the packing on the plug in place of in the shell. Packing-grooves are then formed in the plug parallel with its axis and on either side of the water-way, and the ends of the plug are roughened, so that when the plug is turned round within the cavity of the shell it carries the whole of the packing with it.

In order that my said invention may be most fully understood and readily carried into effect, I will proceed to describe the drawings hereunto annexed.

Referring to the drawings, Figure 1 is an elevation, Fig. 2 is a plan, Fig. 3 is a vertical section, and Fig. 4 is a horizontal section, of a parallel-plug asbestus-packed cock constructed according to my invention.

The cavity in the shell to receive the plug is open at one end only. The packing is received into a cavity, $a$, beneath the plug, also into grooves $b\ b$ formed in the walls of the plug-cavity, and into the enlargement of the plug-cavity, near its mouth, at $c$. To reduce the area of the packing in the cavity $a$ the loose piece or thimble $a'$ is dropped in. It enters a corresponding hole in the end of the plug.

I make the plugs of these cocks parallel, so that they can be pressed down onto the bottom packing or eased off without tightening or slackening the packing in the grooves or top space, and so that the plug and shell can never be jammed metal to metal, or be so far separated as injuriously to expose the packing. The plug should fit in its cavity, so that at all temperatures to which the cock will be exposed the plug will just turn freely within the shell.

The packing which I employ is asbestus. The plug is inserted in the shell, and the packing is rammed into the grooves $b\,b$. The plug is then taken out and packing rammed into the space $a$. The plug is then replaced and forced down to compress this packing, and afterward packing is rammed into the space $c$. There is just so much packing rammed into the space $c$ that when it is sufficiently compressed the gland-cover $d$ rests upon the shoulder of the plug, and, forcing it down, compels it to compress the packing in the space $a$.

A washer, $e$, is sometimes used between the gland-cover and the shoulder of the plug to reduce friction. The bearing-surface of the gland-cover (marked $d'$) is not continuous around the plug; otherwise from inequality in screwing up the gland there might be risk of undue pressure upon one side of the plug.

Figs. 5, 6, 7, and 8 represent a similar cock, but of larger dimensions. In this case, in order to save space, two of the four grooves $b\,b$ are brought close up to the water-way, and at the same time a stop is applied upon the gland-cover, which prevents the plug being turned in such manner as to expose the packing in these grooves to the fluid flowing through the cock, as in the before-referred-to Dewrance and Mallinson patent. In this case also, in place of the washer $e$ and the raised bearing-surfaces $d'$ on the under side of the gland-cover, packing is inserted between the shoulder of the plug and the under side of the gland-cover.

Figure 12:
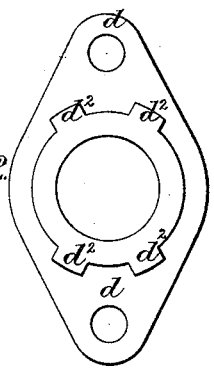
Figure 10:
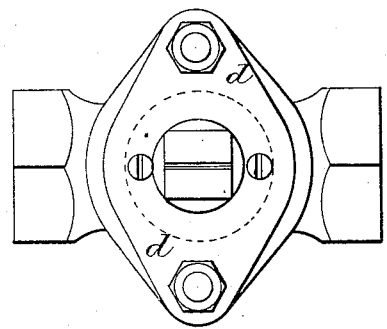

The cavity $c$, as here shown, is circular and of such a size that the upper ends of the grooves $b\,b$ fall within it. The cavity $c$ may, however, be of the same diameter as the plug, and then the upper ends of the grooves $b\,b$ will fall without its circumference, in which case a gland-cover is employed such as is shown at Fig. 12, which is an under-side view. The projections $d^2\,d^2$ correspond to the grooves $b\,b$, these grooves being in this arrangement somewhat enlarged at their upper ends, so that by the screwing up of the gland the packing is compressed not only in the annular space $c$, but also in the grooves $b\,b$.

Figure 1:
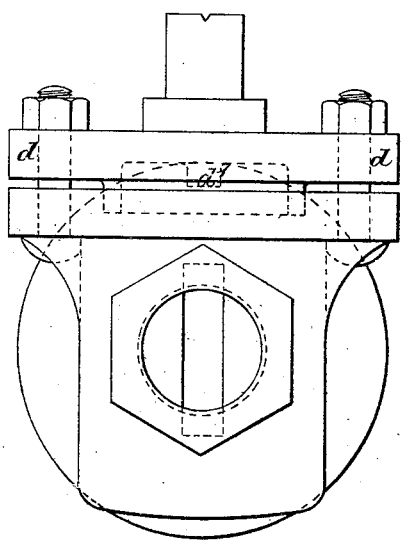
Figure 3:
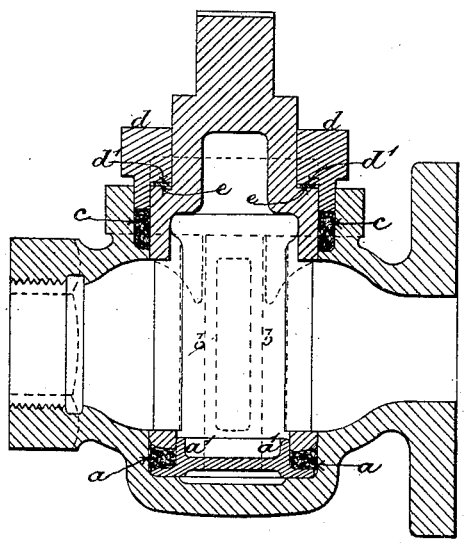
Figure 2:
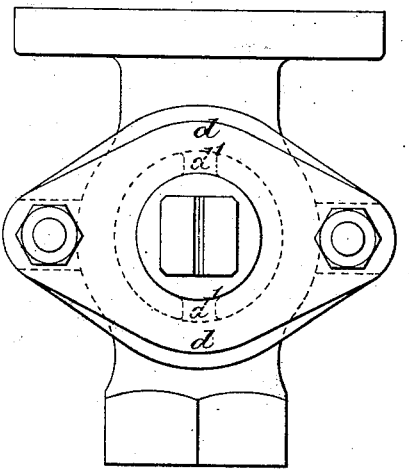
Figure 4:
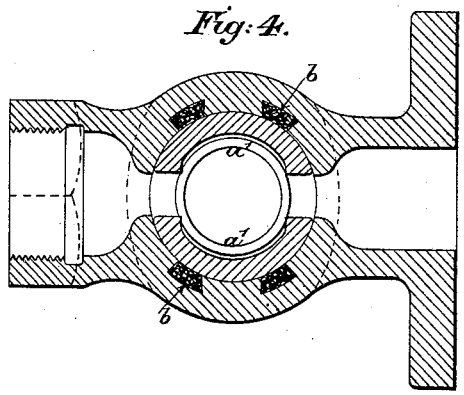
Figure 5:
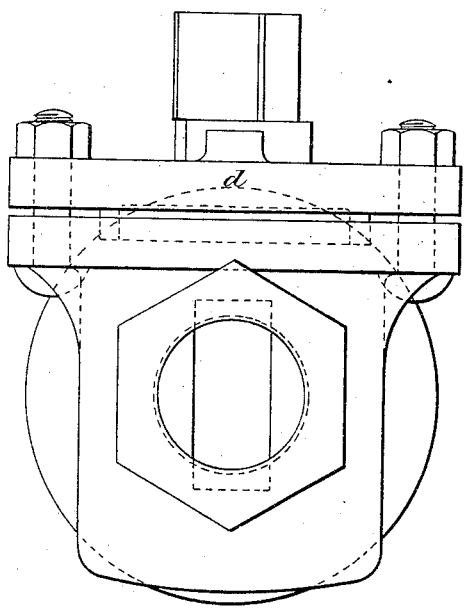
Figure 7:
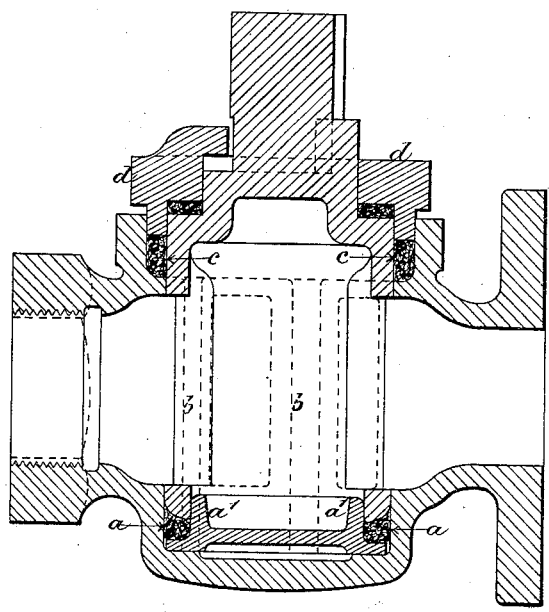
Figure 6:
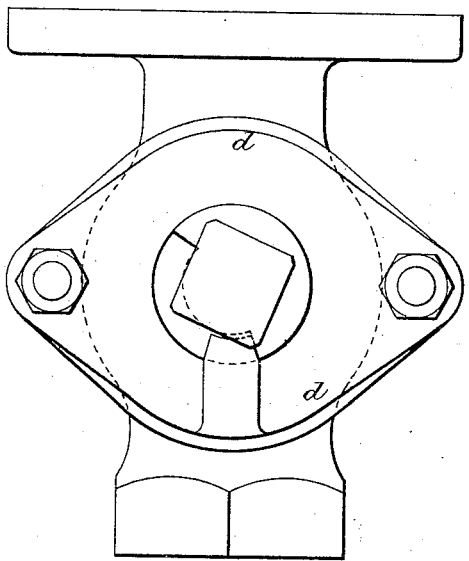
Figure 8:
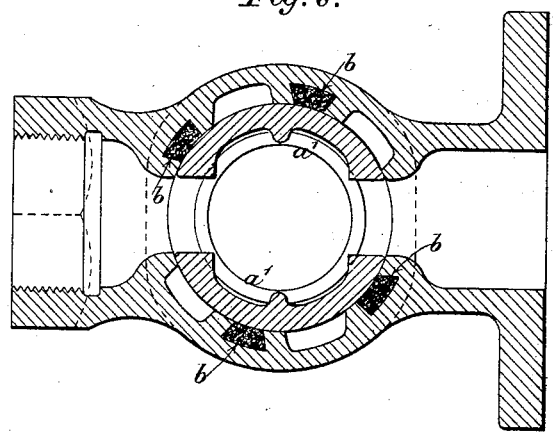
Figure 9:
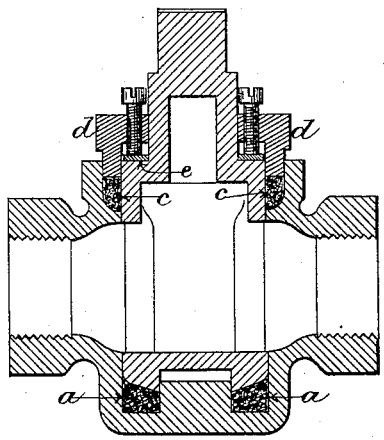
Fig. 9 shows in section, and Fig. 10 in plan, another cock in which the washer is used; but in place of the bearing-surfaces on the gland-cover two set-screws are inserted. They pass through the cover and are screwed down at the last to give a light pressure upon the shoulder of the plug, in order that it may compress the packing beneath the plug.
Figure 11:
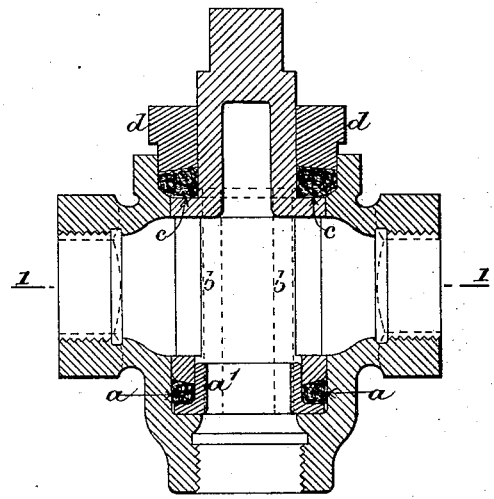
Fig. 11 is a section of a cock in which the shoulder of the plug is so made that the packing at $e$ rests upon it and serves to force down the plug onto the packing at $a$.

The cock represented in Fig. 11 is a three-way cock, a connection at the bottom being provided communicating with the interior of the plug.

Figure 13:
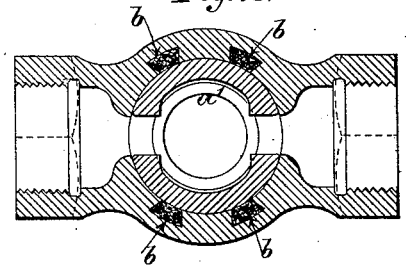
Figure 14:
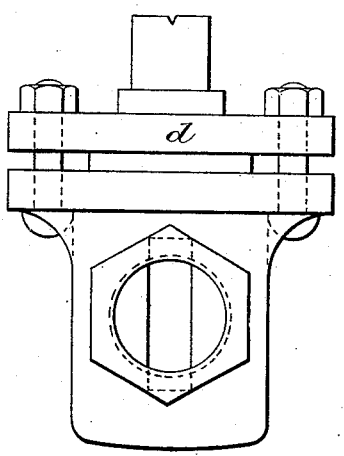
Figure 16:
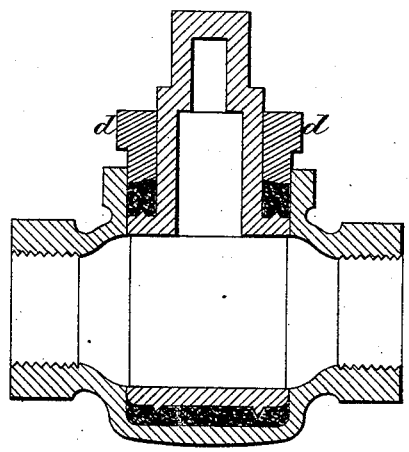
Figure 15:
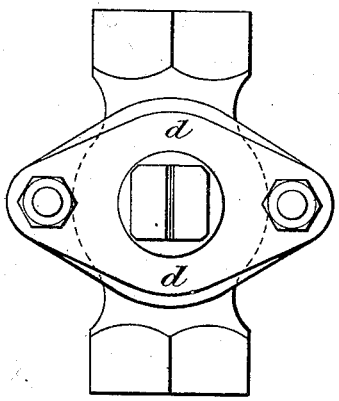
Figure 17:
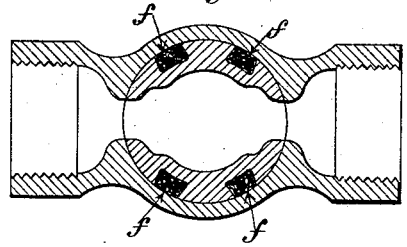

Fig. 13 is a section on the line 1 1 in Fig. 11. Fig. 14 is an elevation, Fig. 15 a plan, Fig. 16 a vertical section, and Fig. 17 a horizontal section, of a cock with a cylindrical plug, and in which the plug carries the whole of the packing. The cavity in the shell is without grooves; but grooves $f\,f$, corresponding to the grooves $b\,b$ of the other arrangements, are formed in the plug. The packing is inserted in the same way as when packing the cocks having the grooves in the shell. There are points or projections formed both upon the under side and on the shoulder of the plug, which serve to attach the packing to the plug, and when the plug is turned the packing moves with it. In all cases exposure of the packing to the current is prevented, as will readily be understood.

Having thus described the nature of my said invention, and the manner of performing the same, I would have it understood that I claim—

1. The packed cock provided with the protected longitudinal or wall packing, and the packing in a cavity at the inner end of the plug, compressed by the plug, substantially as and for the purpose hereinbefore set forth.

2. The shell having the open-mouthed plug-cavity provided with the packing-space, the bottom packing-cavity, $a$, and the longitudinal or wall packing-grooves communicating with said mouth-space and packing-cavity, substantially as and for the purpose hereinbefore set forth.

3. The combination, substantially as hereinbefore set forth, of the shell, its mouth packing, the gland, the plug, the longitudinal or wall packing, and the packing at the inner end of the plug.

4. The loose piece or thimble $a'$, inserted into the cavity of the shell below the inner end of the plug, serving to limit the area of the packing, substantially as described.

London, 1st August, 1879.

JOHN DEWRANCE.

Witnesses:
JOHN DEAN,
17 Gracechurch Street, London, E. C., Clerk to Messrs. Harrison Brothers, Notaries Public.
H. E. DALE,
17 Gracechurch Street, London, E. C., Clerk to Messrs. Harrison Brothers, Notaries Public.